United States Patent
Hughes et al.

(10) Patent No.: US 10,746,330 B2
(45) Date of Patent: Aug. 18, 2020

(54) PIPE COUPLING

(71) Applicant: Palliser Industries, Inc., Calgary (CA)

(72) Inventors: Len P. Hughes, Calgary (CA); Alejandro J. Juan, Calgary (CA)

(73) Assignee: Palliser Industries, Inc., Edmonton (CA)

( * ) Notice: Subject to any disclaimer, the term of this patent is extended or adjusted under 35 U.S.C. 154(b) by 212 days.

(21) Appl. No.: 15/570,960

(22) PCT Filed: May 2, 2016

(86) PCT No.: PCT/US2016/030388
§ 371 (c)(1),
(2) Date: Oct. 31, 2017

(87) PCT Pub. No.: WO2016/179083
PCT Pub. Date: Nov. 10, 2016

(65) Prior Publication Data
US 2018/0112806 A1 Apr. 26, 2018

Related U.S. Application Data (60) Provisional application No. 62/155,494, filed on May 1, 2015.

(51) Int. Cl.
*F16L 23/08* (2006.01)
*F16L 23/18* (2006.01)
*F16L 23/20* (2006.01)

(52) U.S. Cl.
CPC ............ *F16L 23/08* (2013.01); *F16L 23/18* (2013.01); *F16L 23/20* (2013.01)

(58) Field of Classification Search
CPC ............ F16L 23/08; F16L 23/18; F16L 23/20
USPC .......... 285/336, 364, 373, 406, 419
See application file for complete search history.

(56) References Cited

U.S. PATENT DOCUMENTS

| | | | | |
|---|---|---|---|---|
| 2,789,844 | A | * | 4/1957 | Kessler ............ 285/336 |
| 4,218,080 | A | | 8/1980 | Kendrick |
| 5,230,540 | A | * | 7/1993 | Lewis |
| 6,039,319 | A | | 3/2000 | Coonce et al. |
| 6,045,033 | A | * | 4/2000 | Zimmerly ........ F16L 23/08 |
| | | | | 285/336 |

(Continued)

FOREIGN PATENT DOCUMENTS

SU 742664 6/1980

*Primary Examiner* — Zachary T Dragicevich
(74) *Attorney, Agent, or Firm* — Bushman Werner, P.C.

(57) ABSTRACT

A coupling for connecting two tubular members. The coupling being comprised of two hubs with annular flanges having axially outwardly facing frustoconical surfaces. The hubs have axially inwardly facing tapered faces, the radially innermost point of said tapered faces being perpendicular to the axis of the tubular members. The tapered faces of the hubs have registering seal rings grooves formed therein, a seal ring being positioned in the seal ring grooves. The hubs are held together by a pair of outer clamps having inner surfaces shaped for engaging the axially outwardly facing frustoconical surfaces of the hubs. Compression of the clamps toward one another forces the inwardly facing tapered surfaces toward one another and brings them into engagement. The engagement of the tapered surfaces forms a primary metal-to-metal seal. The seal ring within the seal ring groove forms a secondary metal-to-metal seal.

5 Claims, 9 Drawing Sheets

(56) References Cited

U.S. PATENT DOCUMENTS

| | | | | |
|---|---|---|---|---|
| 6,234,545 B1* | 5/2001 | Babuder | ............... | F16L 23/18 |
| | | | | 285/336 |
| 6,394,507 B1 | 5/2002 | Baker | | |
| 7,159,906 B1* | 1/2007 | Vaudreuil | ................. | 285/364 |
| 8,740,260 B1 | 6/2014 | Liew | | |
| 2005/0200129 A1* | 9/2005 | Bongiorno | ................. | 285/364 |
| 2012/0074694 A1* | 3/2012 | Butte | ................. | F16L 23/18 |
| | | | | 285/336 |

* cited by examiner

PIPE COUPLING

CROSS REFERENCE TO RELATED APPLICATION

This application is the National Stage of International Application No. PCT/US2016/030388 filed May 2, 2016, which claims priority to U.S. Application No. 62/155,494 filed on May 1, 2015, the disclosures of which are incorporated herein by reference for all purposes.

FIELD OF THE INVENTION

The present invention relates to couplings for pipe. In particular, the present invention relates to a coupling connection having primary and secondary sealing mechanisms.

BACKGROUND OF THE INVENTION

Typical prior art bolted pipe coupling systems comprise a pair of flanged hubs having hub faces, a compression assembly for urging the hub faces together, and a sealing member disposed between the hub faces. When the compression assembly urges the hubs together, it forms a seal.

Such prior art couplings are limited in the materials with which they can be used. Because the gasket is oftentimes exposed to the materials flowing through the coupled pipes, care must be used to select the material of the gasket so as to not be dissolved, corroded, or otherwise destroyed by the flowing media. In many prior art couplings, the gasket serves as the only seal between abutted faces of the hubs.

SUMMARY OF THE INVENTION

In one aspect, the present invention provides a pipe coupling for joining two tubular members, namely pipe. The pipe coupling has two metal-to-metal seals to prevent leakage. The engagement of the hub faces of the coupling of the present invention forms a primary metal-to-metal seal. A seal ring within a seal ring groove in the hub faces forms a secondary metal-to-metal seal. The seal ring is isolated from the fluid media flowing through the pipes unless the primary seal fails. This increases the lifespan of the coupling significantly.

These and further features and advantages of the present invention will become apparent from the following detailed description, wherein reference is made to the figures in the accompanying drawings.

DETAILED DESCRIPTION OF PREFERRED EMBODIMENTS

The present invention is not limited to use with specific tubulars and can be used with steel pipe, polymeric pipe, polymer-lined pipe, hose, or other conduits which transport gas, fluid, semi-fluid, or solid matter.

As used herein, the terms "axially outermost," "axially outwardly facing," "axially innermost," "axially inwardly facing," and the like refer to the respective axially outer and inner portions of the pipe coupling assembly itself. It will be appreciated that one or more couplings may be employed in a string of pipes. The description of the axially outermost and innermost components of the coupling does not mean they are outermost or innermost pieces on a string of pipe.

Figure 1:
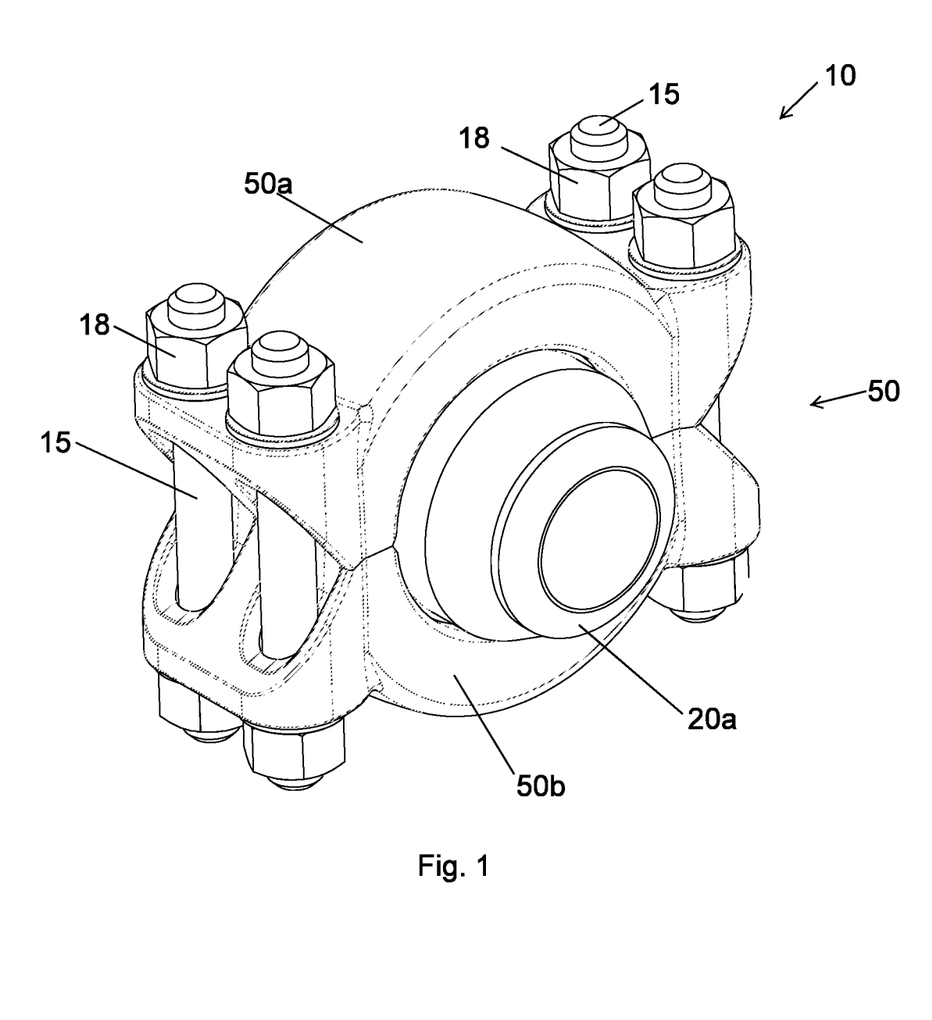
FIG. 1 is an isometric view of the coupling assembly of the present invention.
Figure 2:
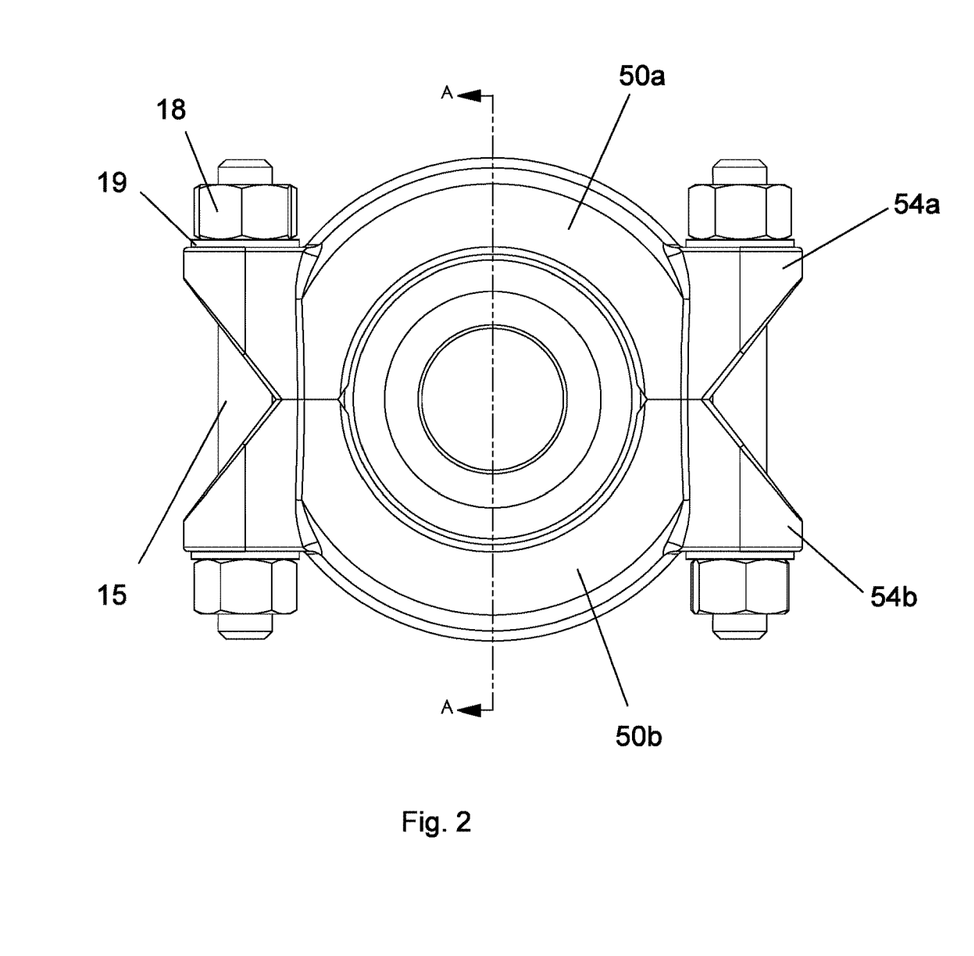
FIG. 2 is a side elevational view of the coupling assembly shown in FIG. 1.
Figure 3:
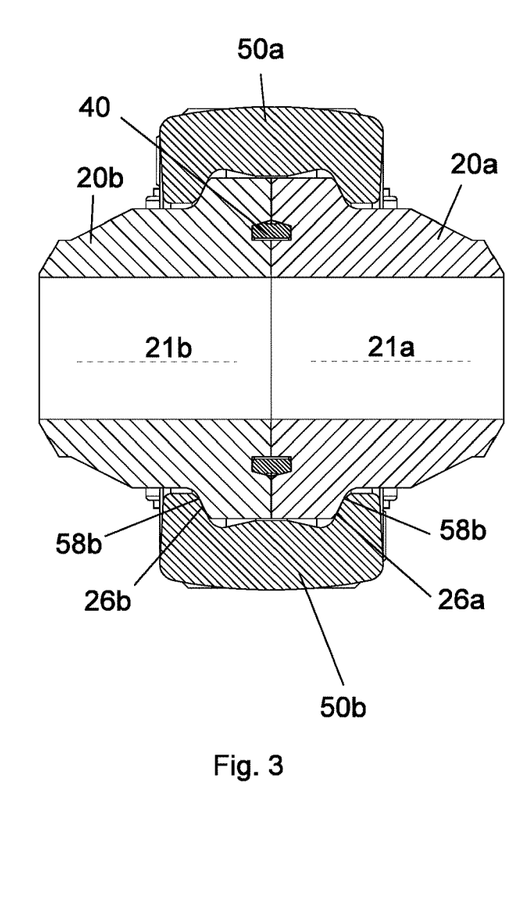
FIG. 3 is a cross-sectional view taken along the lines A-A in FIG. 2.

Turning to FIGS. 1-3 there is shown, generally as 10, the coupling assembly of the present invention. The coupling assembly 10 is made up of two annular hubs 20*a* and 20*b* and clamp assembly 50 comprised of clamp members 50*a* and 50*b*. Each of hubs 20*a* and 20*b* has flow passageways 21*a* and 21*b*, respectively therethrough. Clamp members 50*a* and 50*b* each have a plurality of bolt holes 14. When the clamp members 50*a* and 50*b* are positioned on hubs 20*a* and 20*b*, bolt holes 14 on respective clamp members are in register. Bolts 15 pass through registering bolt holes 14, and nuts 18 are threaded onto the outer ends of bolts 15 to compress clamp members 50*a* and 50*b* together. If needed washers 19 or the like can be positioned between the nuts 18 and the clamp members 50*a* and 50*b*. As seen in FIG. 3, each of hubs 20*a* and 20*b* have seal grooves 30*a* and 30*b*, respectively, in which seal ring 40 is fitted. As will be discussed more hereafter, seal ring 40 forms a secondary metal-to-metal seal.

Figure 4A:
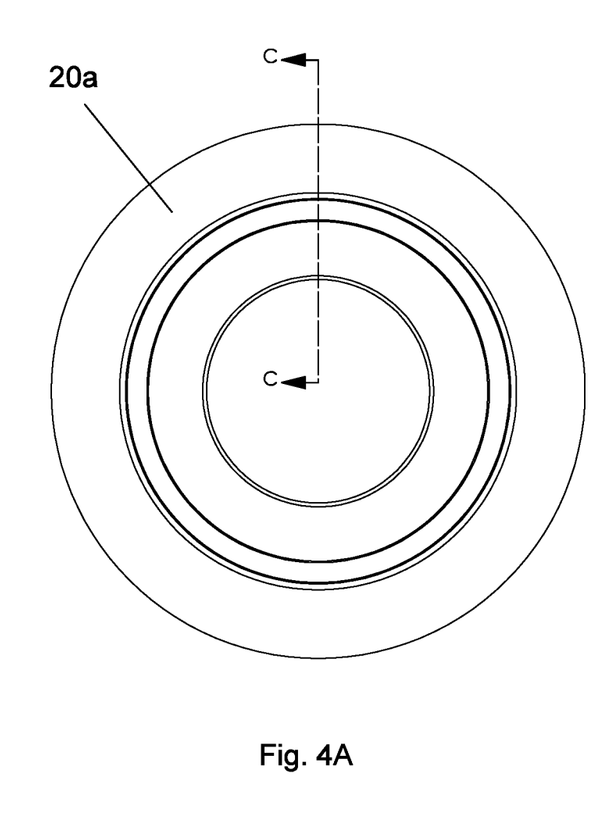
FIG. 4A is a side elevational view of the hub of the present invention.
Figure 4B:
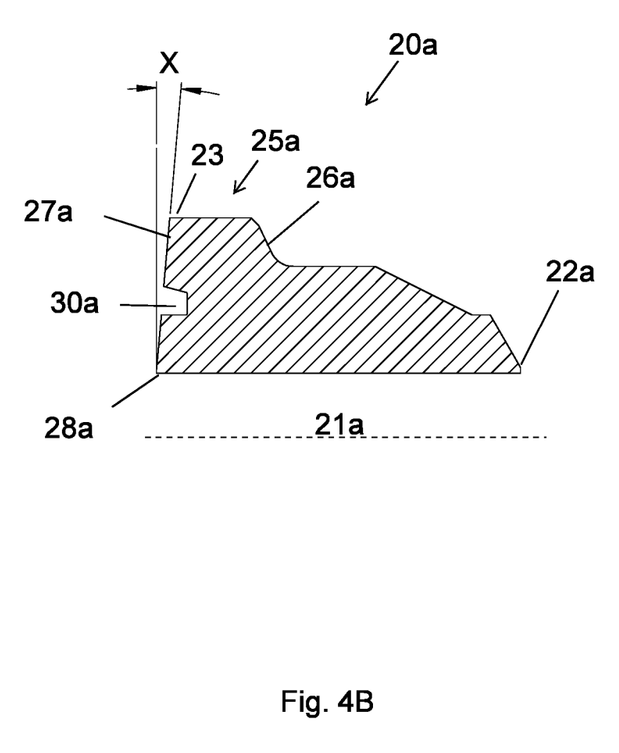
FIG. 4B is a cross-sectional view taken along the lines C-C shown in FIG. 4A.

Turning to FIG. 4A there is shown hub 20*a*. FIG. 4B shows a portion of hub 20*a* in cross-section. It will be understood that hub 20*b* is a mirror image of 20*a* and thus has the same components and will not be described separately. Those parts present on both hubs will be given the same reference numbers and differentiated by the letters "a" and "b", e.g., seal grooves 30*a* and 30*b* are found on respective hubs 20*a* and 20*b*.

Hub 20*a* includes first axial end 22*a* and second axial end 23*a*. First axial end 22*a* is the axially outermost end to which a pipe end is connected by welding or other appropriate means. Second axial end 23*a* is the axially innermost end of hub 20*a* and includes radially outwardly extending annular flange portion 25*a*. The flange portion 25*a* of hub 20*a* has an annularly extending, axially outwardly facing frustoconical flange surface 26*a*. Second axial end 23*a* also has axially inwardly facing, frustoconical or tapered seal face 27*a*. The radially innermost portion of seal face 27*a*, directly and surroundingly adjacent passageway 21*a*, forms an annular seat 28*a* which is perpendicular to the direction of passageway 21*a*. Perpendicular seat 28*a* can be only several thousandths of an inch long. As shown in FIG. 4, the seal face 27a radially outwardly from seat 28a is tapered at angle X. The importance of the tapered seal face 27a and seat 28a will be explained hereafter.

Formed in seal face 27a is an annular seal ring groove 30a, seal ring groove 30a being shaped to receive a portion of seal ring 40. In a preferred embodiment, the radially outer surface of seal ring grooves 30a and 30b are tapered relative to the direction of passageways 21a and 21b, preferably at an angle of from about 13.0° to about 17.0°, most preferably 15.0°. As best seen in FIG. 3, seal grooves 30a and 30b of hub 20a and 20b are in register with one another and form a seal ring channel 45. Seal ring 40 is disposed in seal ring channel 45. Seal ring 40 tapers such that the thickest point is generally in the center and the axially extending sides are tapered. The angle of taper of the axially extending, radially outer surfaces of seal ring 40 is preferably from about 13.0° to about 18.0°, most preferably about 17.0°. It will be appreciated that the angles of taper of the seal ring groove and the seal ring will vary depending on the materials used.

Figure 5A:
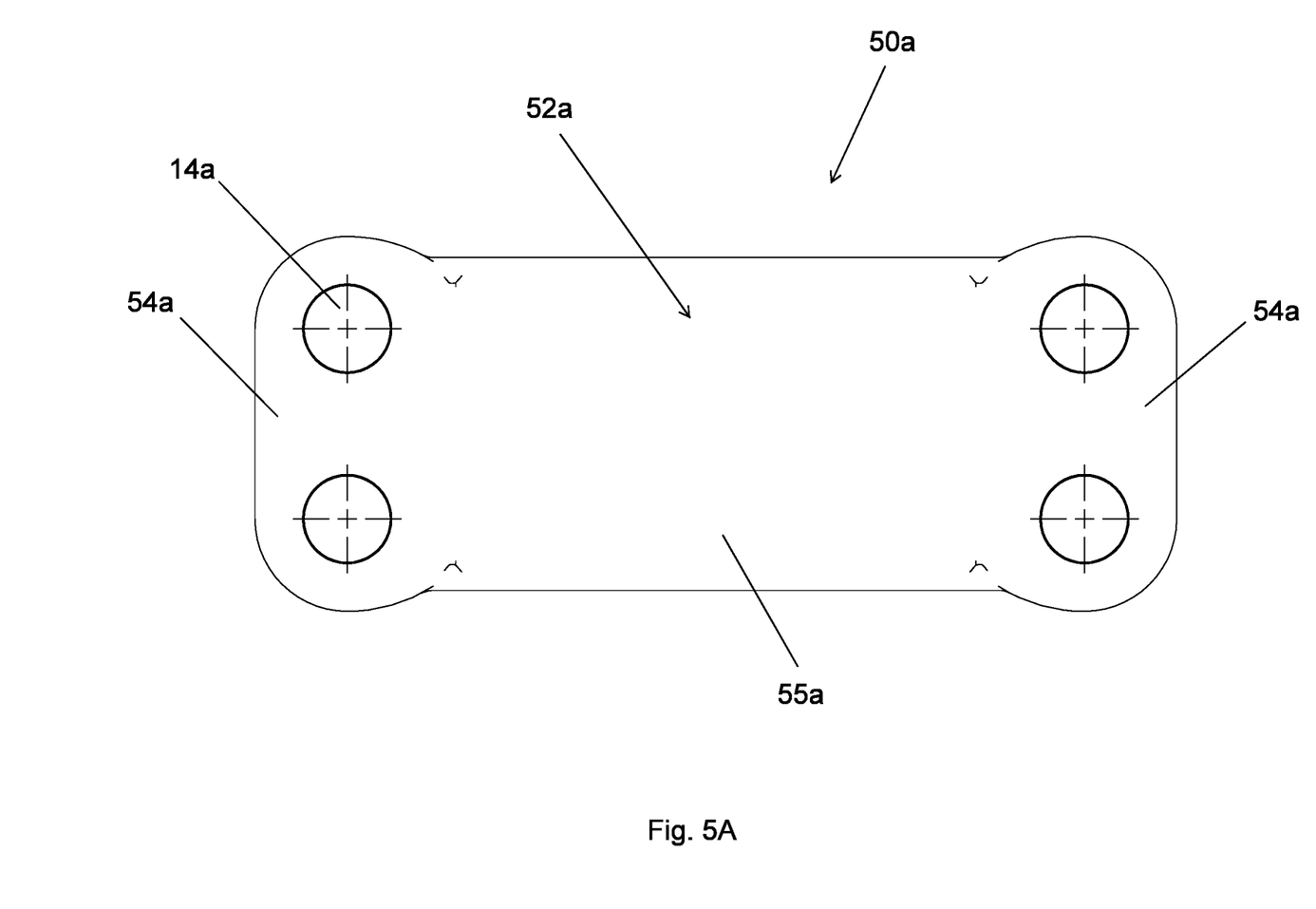
FIG. 5A is a top view of the clamp of the present invention.
Figure 5B:
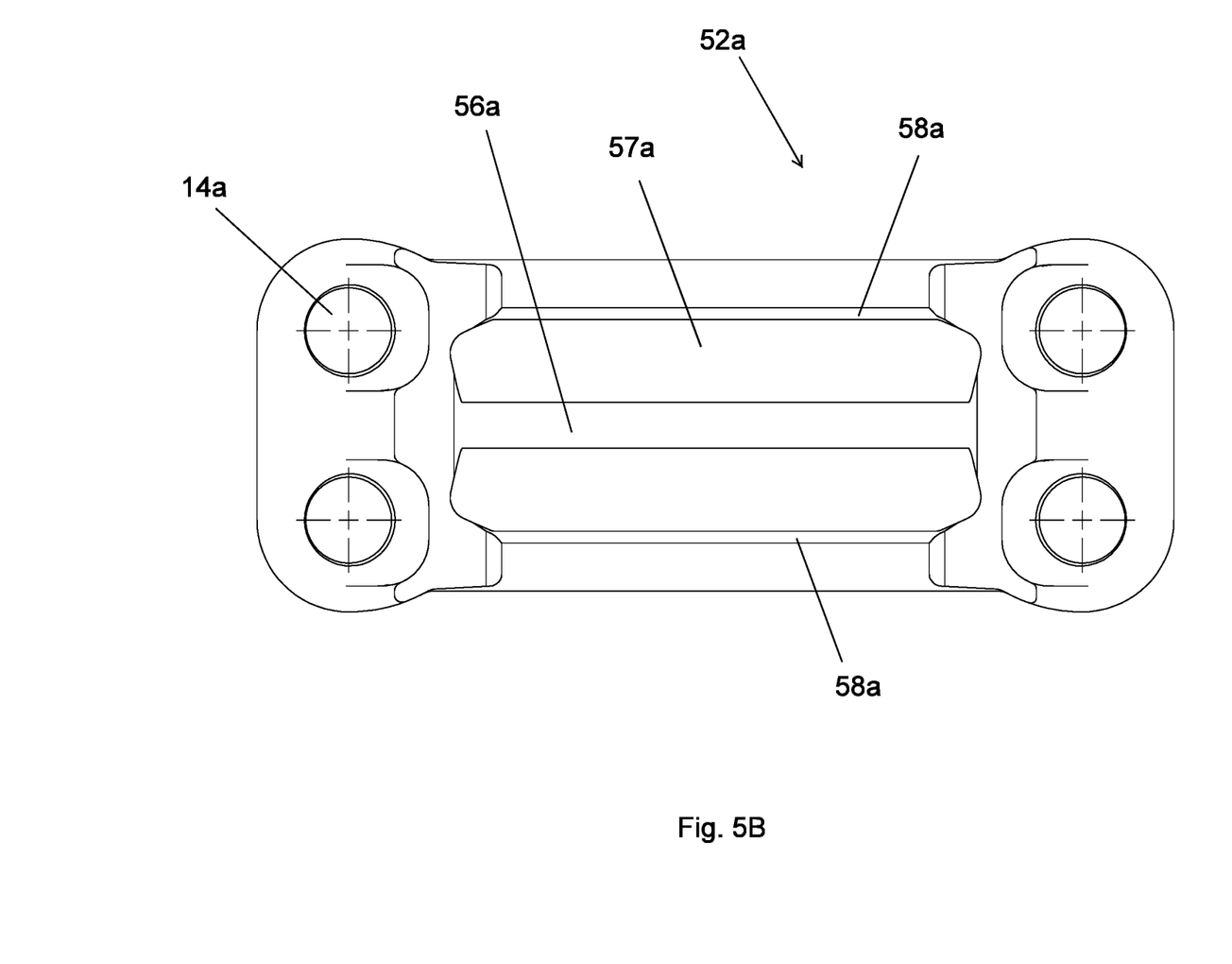
FIG. 5B is a bottom view of the clamp of the present invention.
Figure 6:
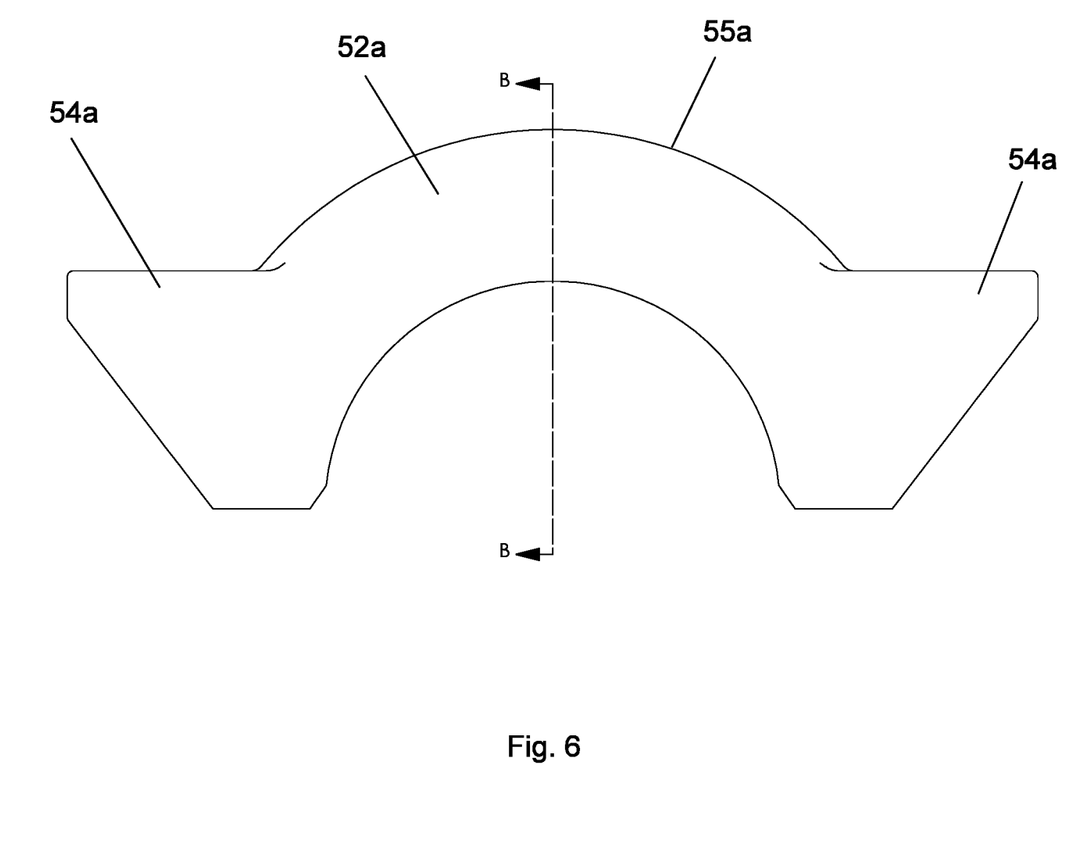
FIG. 6 is an elevational view of the clamp of the present invention.
Figure 7:
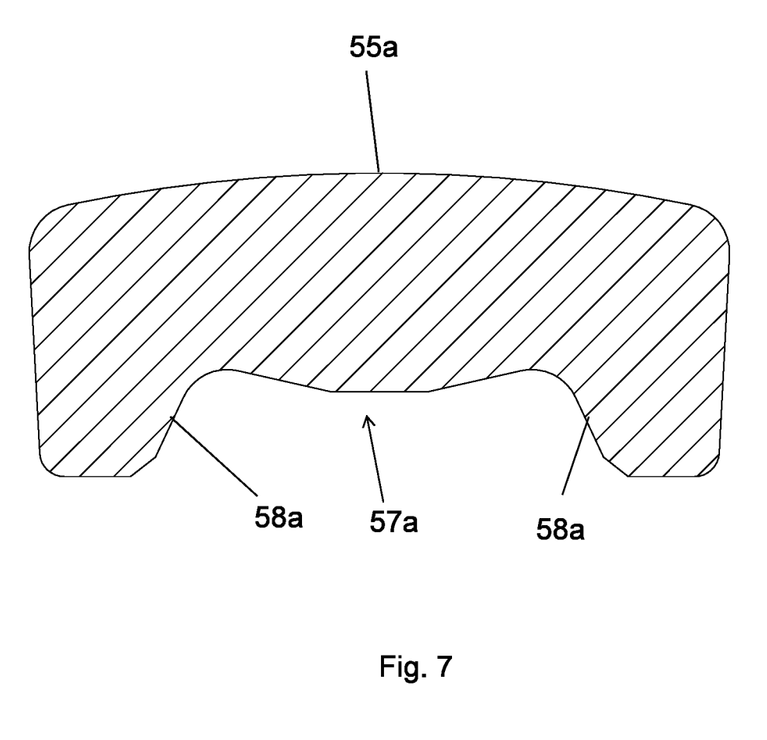
FIG. 7 is a cross-sectional view taken along the lines B-B of FIG. 6.

Turning to FIGS. 5-7, there is shown clamp member 50a of the present invention. It will be understood that clamp member 50b is the same shape and has the same features as clamp member 50a and will thus not be described separately. Clamp member 50a is comprised of generally arcuate central body portion 52a and wings 54a which extend laterally outwardly from opposite sides of body 52a. Each wing 54a has at least one bolt hole 14a extending therethrough. In a preferred embodiment, each wing 54a has a plurality of bolt holes. It will be understood that the exact number of bolt holes can vary and the invention is not limited to a specific number of bolt holes 14a. Body 52a of clamp member 50a has an outer surface 55a and an inner surface 56a. As can best be seen with reference to FIG. 7, inner surface 56a has a groove 57a profiled to overlap the flange portions 25a and 25b of hubs 20a and 20b. In particular, groove 57a has two axially inwardly facing frustoconical surfaces 58a complementary to the axially outwardly facing frustoconical surfaces 26a and 26b of hubs 20a and 20b. In a preferred embodiment, the angle of taper of surfaces 26a and 26b is from 22.0° to about 27.0°, most preferably 25.0°, from a plane running perpendicular to pathways 21a and 21b. The exact angle of taper can vary depending on the materials of which the hub is made.

Figure 8A:
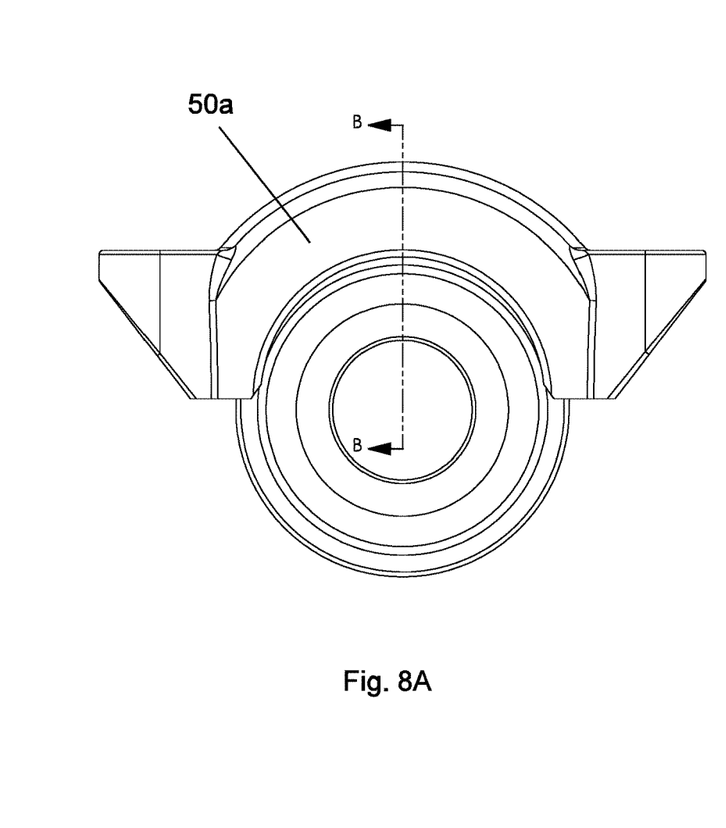
FIG. 8A is an elevational view of a partial assembly of the coupling of the present invention.
Figure 8B:
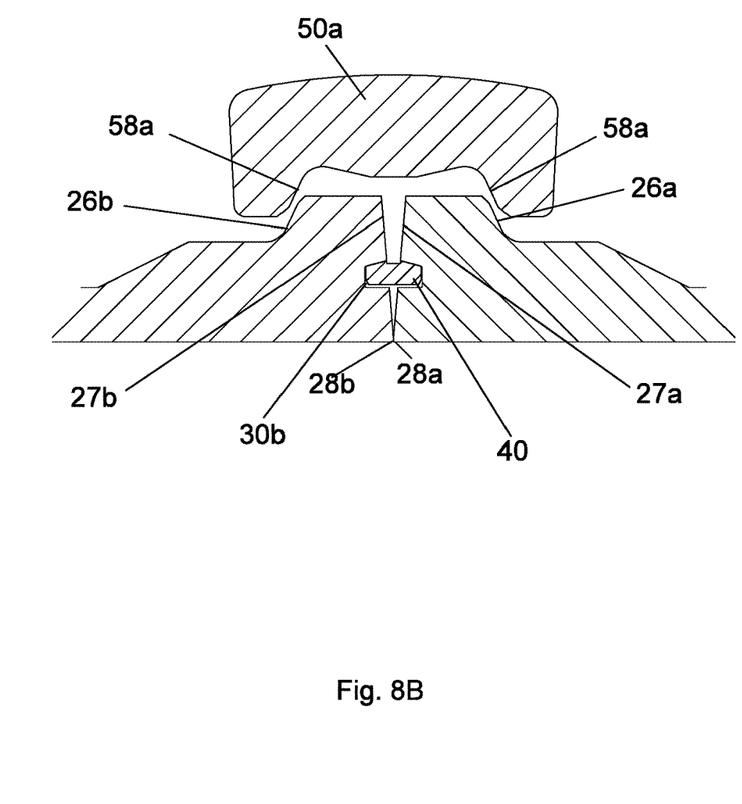
FIG. 8B is a cross-sectional view taken along the lines B-B of FIG. 8A.
Figure 9A:
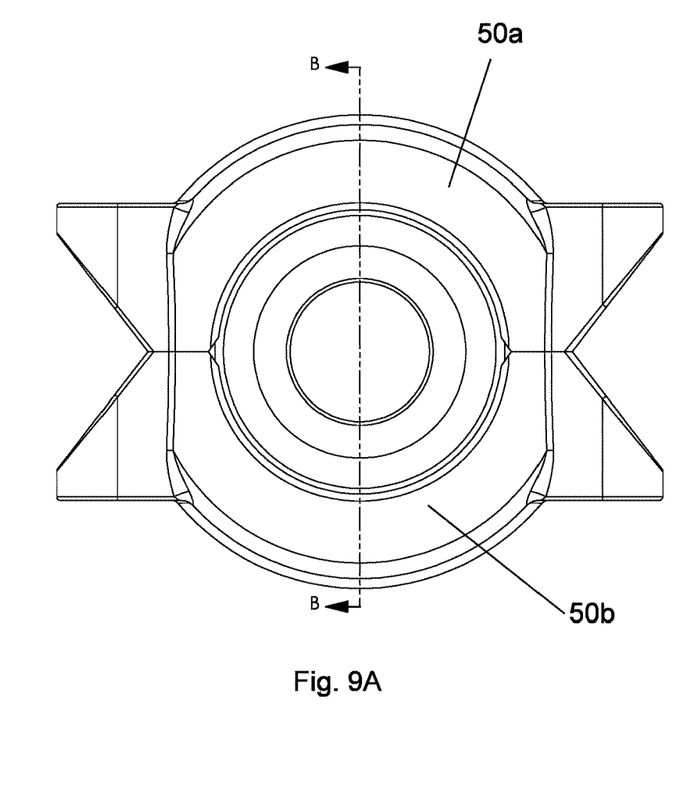
FIG. 9A is an elevational view of a partial assembly of the coupling of the present invention.
Figure 9B:
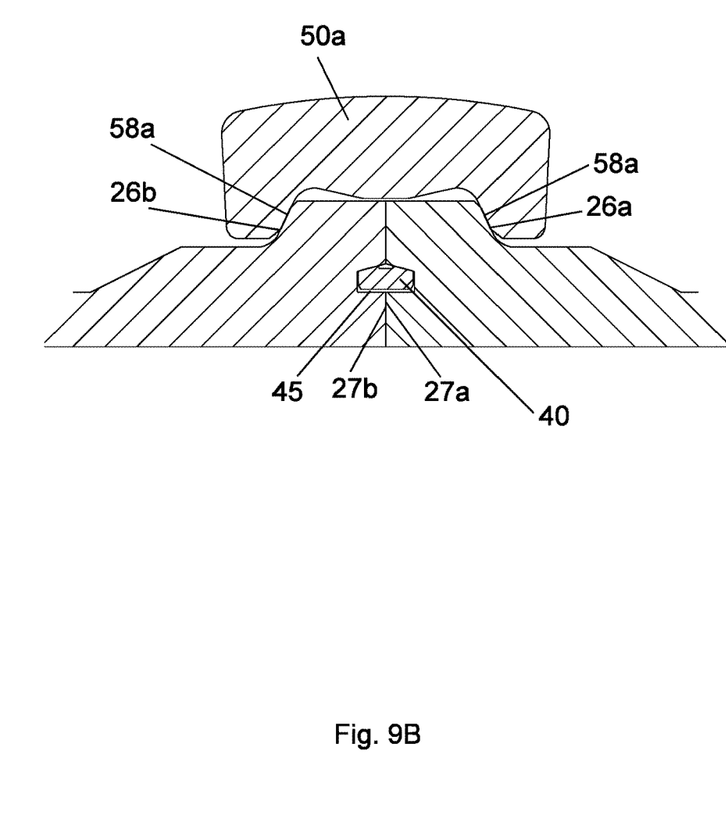
FIG. 9B is a cross-sectional view taken along the lines B-B of FIG. 9A.

Turning to FIGS. 8 and 9 there is shown the operation of the coupling assembly of the present invention. It will be appreciated that axially outer ends 22a and 22b of hubs 20a and 20b would be welded or otherwise attached to the pipes or other tubular members to be coupled together. The attachment of pipes to coupling hubs is well known to those skilled in the art. As best seen in FIG. 8B, prior to clamp members 50a and 50b being tightened, the radially inner seats 28a and 28b of hubs 20a and 20b are engaged. The frustoconical seal faces 27a and 27b of hubs 20a and 20b are not yet engaged due to their taper. As best seen in FIG. 8B, faces 27a and 27b taper axially away from one another, leaving a gap between them when the connection is not fully made up. Turning to FIG. 9B, when clamp members 50a and 50b are engaged and initially tightened the inwardly facing surfaces 58a of the clamp member 50a engage the outwardly facing surfaces 26a and 26b of the hubs 20a and 20b. Similarly, the inwardly facing surface 58b of the clamp member 50b engage the outwardly facing surfaces 26a and 26b of the hubs 20 and 20b. The engagement by clamps 50a and 50b force seal faces 27a and 27b together. As clamp assembly 50 is further tightened, hubs 20a and 20b are forced against one another in the direction of arrows A. Thus, as seen in FIG. 9B, the gap between seal faces 27a and 27b at the radially outermost portion of the hubs closes.

The taper of the seal faces 27 is important to the operation of the coupling of the present invention. Forcing the tapered faces 27a and 27b together induces high contact stresses and yielding of the metal adjacent passageways 21a and 21b. It will be appreciated that the exact angle of taper of faces 27a and 27b varies based on the material of the hubs. In a preferred embodiment though the angle of taper is from 0.10° to about 0.30°, most preferably 0.10°, relative to a plane perpendicular to the direction of passageways 21a and 21b. The taper extends along substantially the entire faces 27a and 27b. Only seats 28a and 28b, which can be only a few thousandths of an inch are perpendicular to the direction of passageways 21a and 21b.

It will be apparent from FIG. 9 that when the coupling assembly is fully made up, the engagement of perpendicular seats 28a and 28b forms the primary metal-to-metal seal. Since there is no gap between the seats 28a and 28b, turbulence, erosion and crevice corrosion at the joint interface is virtually eliminated, allowing for a streamlined flow of the media through the coupling. Seal ring 40 in interference fit with the tapered surfaces of seal ring grooves 30a and 30b forms the secondary metal-to-metal seal. This provides a distinct advantage over the prior art coupling assemblies as the seal ring 40 is isolated from direct exposure to internal fluids as long as the primary seal is intact. If the primary seal is compromised, the seal ring 40 is pressure activated by the internal pressure of the fluid. It will be appreciated that the seal ring 40 also assists in guiding the joint during make-up.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A coupling assembly for connecting tubular members, comprising:
   a first hub defining a flow path, said first hub having an annular radially outwardly extending first flange, said first flange having an annular axially outwardly facing first frustoconical surface, said first hub having an annular axially inwardly facing first tapered sealing face;
   a second hub defining a flow path, said second hub having an annular radially outwardly extending second flange, said second flange having an annular axially outwardly facing second frustoconical surface, said second hub having an annular axially inwardly facing second tapered sealing face;
   a first seal ring groove formed in said first tapered sealing face;
   a second seal ring groove formed in said second tapered sealing face;
   said first and second seal ring grooves being in register;
   a seal ring disposed within said first and second seal ring grooves, said seal ring being isolated from said flow path;

a clamping assembly comprising a pair of clamps, each of said clamps having an inner surface shaped to engage said first and second frustoconical surfaces of said first and second hubs;

a compression assembly operative to force said clamps into engagement with said first and second frustoconical surfaces, said engagement with said first and second frustoconical surfaces forcing said first and second tapered sealing faces into metal-to-metal sealing engagement with one another to form a primary metal-to-metal seal.

2. The coupling assembly of claim 1, wherein said seal ring has an interference fit with said seal ring grooves.

3. The coupling assembly of claim 1, wherein a radially innermost portion of said tapered first sealing face comprises a first seat, said first seat being perpendicular to said flow path, and wherein a radially innermost portion of said tapered second sealing face comprises a second seat, said second seat being perpendicular to said flow path.

4. The coupling assembly of claim 1, wherein the compression assembly comprises a plurality of nuts and bolts.

5. The coupling assembly of claim 1, wherein said first and second tapered sealing faces are at an angle of from about 0.10° to about 0.30°.

* * * * *